(12) United States Patent
Sindalovsky et al.

(10) Patent No.: US 9,385,897 B2
(45) Date of Patent: Jul. 5, 2016

(54) METHODS AND APPARATUS FOR ADAPTING TRANSMITTER EQUALIZATION COEFFICIENTS BASED ON RECEIVER GAIN ADAPTATION

(75) Inventors: Vladimir Sindalovsky, Perkasie, PA (US); Mohammad S. Mobin, Orefield, PA (US); Lane A. Smith, Easton, PA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 337 days.

(21) Appl. No.: 13/552,012

(22) Filed: Jul. 18, 2012

(65) Prior Publication Data

US 2014/0023131 A1    Jan. 23, 2014

(51) Int. Cl.
*H03H 7/30* (2006.01)
*H03H 7/40* (2006.01)
*H03K 5/159* (2006.01)
*H04L 25/03* (2006.01)

(52) U.S. Cl.
CPC .................... *H04L 25/03343* (2013.01)

(58) Field of Classification Search
CPC ................................... H04L 25/03343
USPC .................. 375/232, 295, 316, 219
See application file for complete search history.

(56) References Cited

U.S. PATENT DOCUMENTS

| | | | |
|---|---|---|---|
| 5,678,198 A | | 10/1997 | Lemson |
| 6,141,634 A | * | 10/2000 | Flint et al. ............. 703/18 |
| 6,804,267 B1 | * | 10/2004 | Long et al. ............. 370/524 |
| 2007/0274379 A1 | * | 11/2007 | Valliappan et al. ....... 375/232 |
| 2008/0080608 A1 | | 4/2008 | Mobin et al. |
| 2009/0097538 A1 | | 4/2009 | Aziz et al. |
| 2010/0046683 A1 | | 2/2010 | Beukema et al. |
| 2010/0177816 A1 | | 7/2010 | Malipatil et al. |
| 2010/0238993 A1 | | 9/2010 | Huang et al. |
| 2011/0228839 A1 | | 9/2011 | Agrawal et al. |
| 2013/0215940 A1 | * | 8/2013 | Cendrillon et al. ...... 375/222 |

OTHER PUBLICATIONS

Extended Search Report for European Patent Application No. 13177107.3, dated Sep. 7, 2015, 11 pages.

* cited by examiner

*Primary Examiner* — Freshteh N Aghdam (57) ABSTRACT

Methods and apparatus are provided for adapting transmitter equalization coefficients based on receiver gain adaptation. Equalization coefficients of a transmitter that communicates over a channel with a receiver are adapted by determining if a gain value for an amplifier in the receiver is within a limit of the amplifier; and preventing one or more adjustments to the transmitter equalization coefficients if the gain value does not satisfy the upper or lower limit of the amplifier. The gain adjustments comprise, for example, up and down requests for the transmitter equalization coefficients. One or more enable flags can optionally be set based on whether the gain value is within the limit of the amplifier.

28 Claims, 5 Drawing Sheets

METHODS AND APPARATUS FOR ADAPTING TRANSMITTER EQUALIZATION COEFFICIENTS BASED ON RECEIVER GAIN ADAPTATION

BACKGROUND

In many data communication applications, serializer and de-serializer (SerDes) devices facilitate the transmission of parallel data across a serial link. Parallel data is converted by the serializer at the transmitter to serial data before transmission through a communications channel to the receiver. A de-serializer in the receiver converts the serial data to parallel data. Signals arriving at the receiver are typically corrupted by intersymbol interference (ISI), crosstalk, echo and other noise. Thus, receivers typically amplify and equalize the channel to compensate for such distortions, often using a number of different equalization techniques. Decision-feedback equalization (DFE), for example, is a widely-used technique for removing intersymbol interference. For a detailed discussion of decision feedback equalizers, see, for example, R. Gitlin et al., Digital Communication Principles, (Plenum Press 1992) and E. A. Lee and D. G. Messerschmitt, Digital Communications, (Kluwer Academic Press, 1988), each incorporated by reference herein. Equalization may also be employed by the transmitter to pre-condition (e.g., pre-emphasize) the signal prior to transmission.

Equalization generally requires an estimate of the transfer function of the channel to establish the equalization parameters. The frequency-dependent signal degradation characteristics of the communications channel, however, often vary over time or may be not known a priori. Thus, in such environments, adaptive equalization is often employed to vary the equalization parameters over time to mitigate the signal degradation. In this manner, the equalization can adaptively respond to changes in channel characteristics or ambient conditions, such as temperature and humidity, and/or adapt from default values to the current channel characteristics. Adaptation algorithms typically adapt the filter coefficients in accordance with the signal statistics or the signal spectrum. For example, least mean square (LMS) adaptation techniques are often employed to establish the equalization parameters based on observations of the received signal over time.

Adaptation of the equalization parameters in the transmitter, however, may adversely impact the gain adjustments and/or equalization performed in the receiver (or vice versa). For example, in the case of high attenuation channels, it has been found that the equalizer coefficients in the transmitter are often increased towards their upper limits, causing the variable gain amplifier (VGA) in the receiver to likewise settle to its upper limits. Thus, the output of the VGA will not follow further increases in emphasis by the transmit equalizer. As a result, the data eye opening will be smaller and jitter tolerance in the receiver is reduced.

A need therefore exists for improved adaptive equalization techniques that adjust the transmitter equalization coefficients based on the gain adaptation in the receiver.

SUMMARY

Generally, methods and apparatus are provided for adapting transmitter equalization coefficients based on receiver gain adaptation. According to one embodiment of the invention, equalization coefficients of a transmitter that communicates over a channel with a receiver are adapted by determining if a gain value for an amplifier in the receiver is within a limit of the amplifier; and preventing one or more adjustments to the equalization coefficients if the gain value does not satisfy the limits of the amplifier.

In one embodiment of the invention, the gain adjustments comprise up and down requests for the transmitter equalization coefficients. For example, an upward adjustment request can be prevented if the gain value does not satisfy a lower limit of the amplifier and a downward adjustment request can be prevented if the gain value does not satisfy an upper limit of the amplifier. In addition, one or more flags can optionally be set based on whether the gain value is within the limit of the amplifier. The transmission of the transmitter equalization coefficient adjustments to the transmitter can optionally be enabled or disabled based on the flags.

A more complete understanding of embodiments of the present invention will be obtained by reference to the following detailed description and drawings.

DETAILED DESCRIPTION

Embodiments of the present invention can be manifest in adaptive equalization techniques that adjust the transmitter equalization coefficients based on the VGA gain adaptation in the receiver. As indicated above, when the equalization coefficients in the transmitter (e.g., for a TXFIR filter) are increased in their negative value, the VGA in the receiver may settle to its upper limits. Thus, the output of the VGA in the receiver will not follow further increases in emphasis by the transmit equalizer. As a result, the data eye opening will be smaller and the jitter tolerance will be impaired. According to one embodiment of the invention, the adaptation of the transmitter equalization coefficients is limited such that the equalizer cannot go beyond the abilities of the VGA to amplify the incoming received signal to the required level. In one embodiment the VGA gain adaptation is monitored and when the VGA reaches an upper or lower limit, further adjustments of the transmit equalizer coefficients are prevented.

Figure 1:
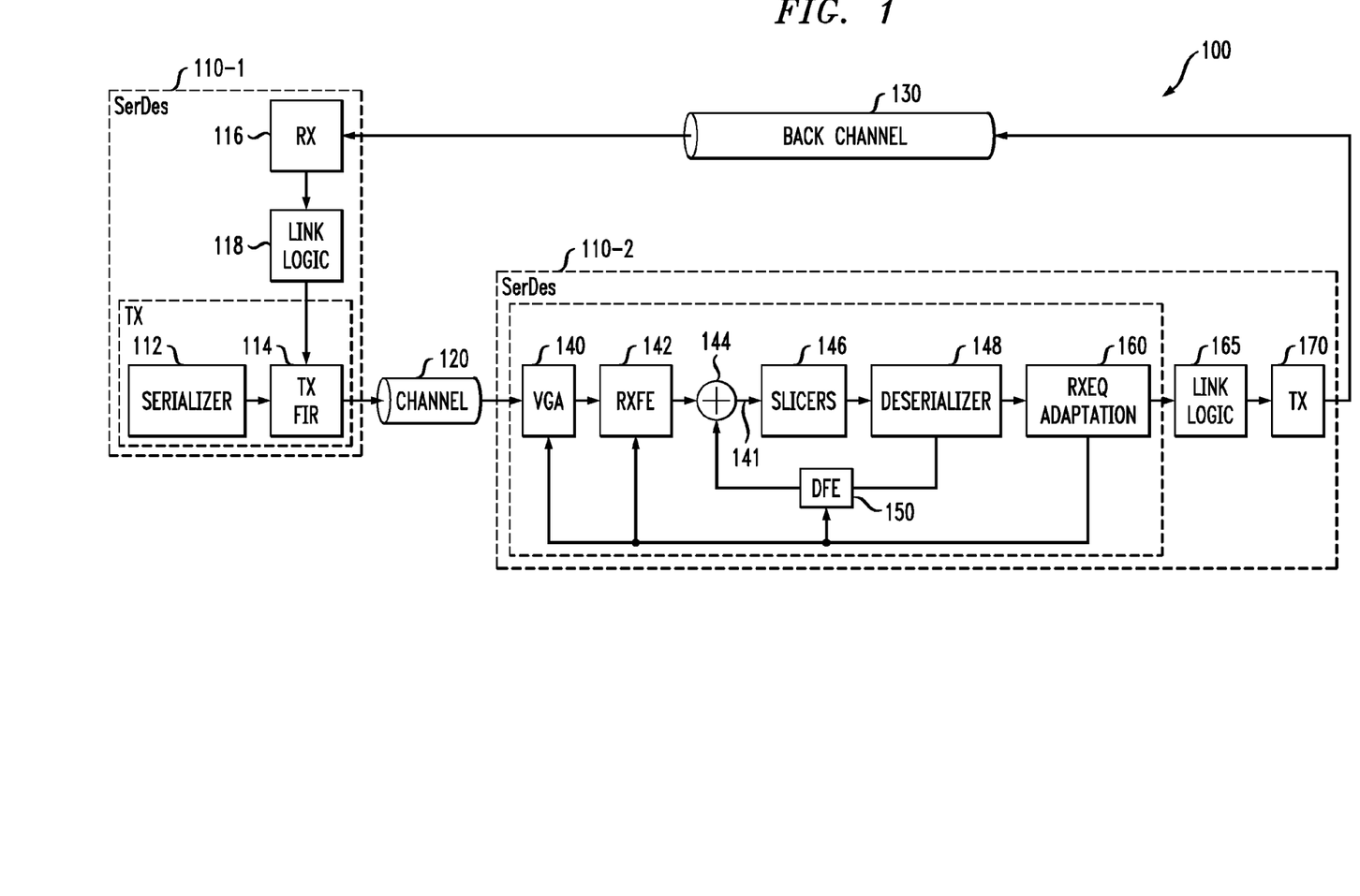
FIG. 1 is a block diagram of a communication system in which embodiments of the invention may be employed.

FIG. 1 is a block diagram of a communication system 100 in which embodiments of the invention may be employed. As shown in FIG. 1, the communication system 100 comprises two SerDes devices 110-1 and 110-2 that communicate over a channel 120. In the configuration of FIG. 1, the SerDes device 110-1 is operating in a transmit mode and the SerDes device 110-2 is operating in a receive mode. In addition, as discussed further below, adaptation algorithms in the receive SerDes device 110-2 determine one or more adaptive equalization parameters for the transmit SerDes device 110-1, which are communicated from the receive SerDes device 110-2 to the transmit SerDes device 110-1 using a back channel 130.

As previously indicated, parallel data is converted by a serializer 112 in the transmit SerDes device 110-1 to serial data before transmission through the communications channel 120 to the receive SerDes device 110-2 where it is converted by a de-serializer 148 from serial data to parallel data. The serialized transmit data is preconditioned (e.g., pre-emphasized) by a transmit finite impulse response (TXFIR) filter 114 to compensate for impairments caused by the channel 120, in a known manner. The coefficients for the TXFIR filter 114 are determined by adaptation algorithms within a receiver equalization (RXEQ) adaptation block 160 in the receive SerDes device 110-2, as discussed further below in conjunction with equation (1) and FIG. 4.

As shown in FIG. 1, the filtered serial output of the TXFIR filter 114 is applied to the channel 120 and received by the receive SerDes device 110-2. The received signal is initially amplified by a Variable Gain Amplifier (VGA) 140, and then enhanced in a receiver front end (RXFE) 142, typically using adjustable high pass filters in order to further mitigate channel impairments. The output of RXFE 142 is applied to an adder 144. In addition, a DFE correction from a decision-feedback equalizer (DFE) 150 is applied to the adder 144 in a feedback fashion to produce a DFE corrected signal 141. The DFE correction compensates for Inter Symbol Interference (ISI) occurring in the channel 120. The DFE corrected signal 141 is then sampled by slicers 146. As discussed further below in conjunction with FIG. 2, the slicers 146 typically sample the serial data one or more times for each serial bit duration Unit Interval (UI) in order to recover the serial data and bit clock. The sampled serial data from the slicers 146 is then deserialized by deserializer 148. The recovered data from deserializer 148 is processed in a feedback loop by the DFE 150 to generate the DFE correction. The recovery of the bit clock and other timing issues are well-known to those of ordinary skill in the art.

The recovered data from deserializer 148 is also processed by one or more adaptation algorithms within the RXEQ adaptation block 160 in the receive SerDes device 110-2 to determine equalization parameters for the VGA 140, RXFE 142 and DFE 150. Generally, the adaptation is performed using recovered data and error information through the RXEQ Adaptation block 160. The adaptation algorithm within the RXEQ adaptation block 160 may be implemented, for example, as the well-known LMS or Zero Forcing (ZF) algorithms. Exemplary adaptation algorithms are discussed further below in the section entitled "Exemplary Adaptation Algorithms." For example, the VGA 140 receives a gain control signal from the RXEQ adaptation block 160. The RXFE 142 and DFE 150 receive filter coefficients from the RXEQ adaptation block 160.

In addition, as indicated above, the filter coefficient adjustments for the TXFIR filter 114 in the transmit SerDes device 110-1 are also determined by the RXEQ adaptation block 160. For example, the RXEQ adaptation block 160 can employ the LMS algorithm to produce TXFIR UP or DN (down) adjustment requests for different TXFIR coefficients. The TXFIR UP or DN adjustment requests generated by the RXEQ adaptation block 160 change the amount of emphasis for main cursor, pre-cursors and post-cursors in the TXFIR filter 114, thus training the remote transmit SerDes device 110-1 to the conditions of the particular channel 120. Pre-cursor and post cursor TXFIR coefficients are normally negative values to create pre-emphasis. Thus, a DN adjustment request indicates an increase in the amount of pre-emphasis, and an UP adjustment request indicates a decrease in the amount of pre-emphasis.

The RXEQ adaptation block 160 applies the determined TXFIR coefficient adjustments to link logic 165, which in turn applies the coefficient adjustment requests to the transmit (TX) portion 170 of the receive SerDes device 110-2. The TX portion 170 of the receive SerDes device 110-2 transmits UP or DN (down) requests for the coefficients over the back channel 130 to the receive (RX) portion 116 of the SerDes device 110-1. Link logic 118 applies the received filter UP or DN requests for coefficients to the TXFIR filter 114 thus changing the amount of pre-emphasis or the main cursor value.

While the present invention is described in the context of the communication system 100 having two SerDes devices 110-1 and 110-2, the present invention can apply to any communication system having serial communications from a transmitter to a receiver and where equalization updates can be provided from the receiver to the transmitter, as would be apparent to a person of ordinary skill in the art.

Figure 2:
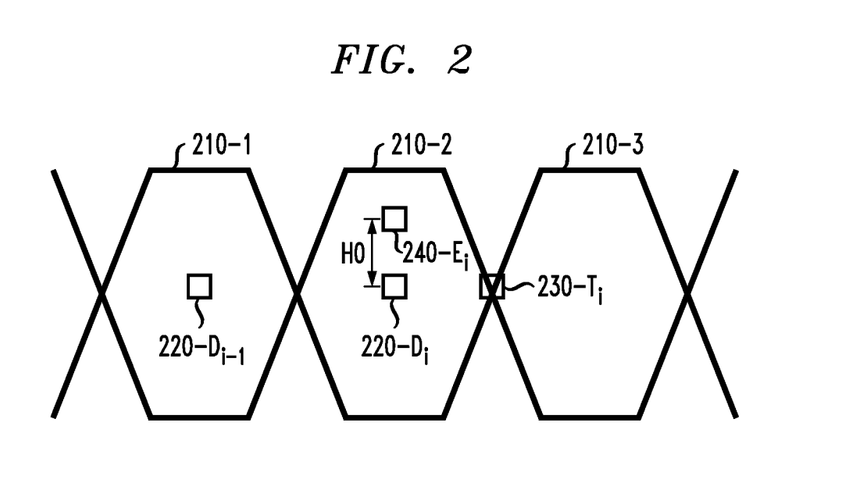
FIG. 2 illustrates a sampling of a series of data eyes by the slicers of FIG. 1.

FIG. 2 illustrates a sampling of a series of data eyes 210-1 through 210-3 corresponding to the DFE corrected signal 141 by slicers 146. The slicers 146 of FIG. 1 comprise two data slicers 220-$D_i$ and 220-$D_{i-1}$, transition slicer 230-$T_i$, and error slicer 240-$E_i$. When the CDR is properly locked to the incoming data in one embodiment, the transition slicer 230-$T_i$ is aligned with the statistical middle of the data transitions crossing level "0," data slicer 220-$D_i$ is aligned to the statistical center of the data eye with a vertical (voltage) offset of zero, and the error slicer 240-$E_i$ has the same timing alignment as data slicer 220-$D_i$ but with a vertical offset of H0, typically positioning the error slicer 240-$E_i$ in the statistical middle of the data levels at the center of the eye (statistical middle between inner and outer data eyes), as discussed further below in conjunction with FIG. 5. The H0 vertical offset is achieved as a part of VGA adaptation, and the error slicer 240-$E_i$ is used in the LMS adaptation algorithm of all RXEQ parameters, as well as remote TXFIR coefficients, in a known manner. There may be one or more error slicers 240-$E_i$ per data eye.

Exemplary Adaptation Algorithms

The LMS adaptation algorithm for DFE coefficients, $c_n$, can be described by the following equation in the exemplary case of one error slicer per data eye:

$$Cn = \overline{(D_k \text{ Esign}_k)} ? \Sigma_0^\infty \overline{(D_{k-a} E_k)} : 0 \qquad [1]$$

In equation (1), if the current data sample $D_k$ from data slicer 220-$D_k$ has the same sign as the error offset $\text{Esign}_k$, then an exclusive NOR ("XNOR") operation is applied to the data sample offset by the coefficient index n, $D_{k-n}$, and the current error sample, $E_k$, from error slicer 240-$E_k$, and accumulated as an UP or DOWN adjustment into the coefficient value.

The adaptation algorithm for the coefficients for the remote TXFIR filter 114 can also be described by equation (1) with a corresponding +1 or −1 index offset n for pre-cursor and post cursor adaptation.

The adaptation algorithms for the gain adjustment for the VGA 140 and the offset H0 for the error latch, 240-$E_i$, of FIG. 2 are similar. The interdependence of H0 and VGA adaptation is discussed further below in conjunction with FIG. 3.

Generally, the adaptation for the offset H0 for the error latch, 240-$E_i$, of FIG. 2 may be described as:

$$H0 = \overline{(D_k \text{ Esign}_k)} ? \Sigma_0^\infty \overline{(D_k E_k)} : 0 \qquad [2]$$

In equation (2), if the current data sample $D_k$ from data slicer 220-$D_k$ has the same sign as the error offset $\text{Esign}_k$, then an exclusive NOR "XNOR" operation is applied to the current data sample $D_k$ and the current error sample. $E_k$, from error slicer 240-$E_k$, and accumulated as an UP or DOWN adjustment into the error slicer offset value.

For a more detailed discussion of equalization adaptation techniques, see, for example, United States Published Patent Application No. 20100046598, entitled "Adaptation Of A Linear Equalizer Using A Virtual Decision Feedback Equalizer (VDFE)," incorporated by reference herein.

Figure 3:
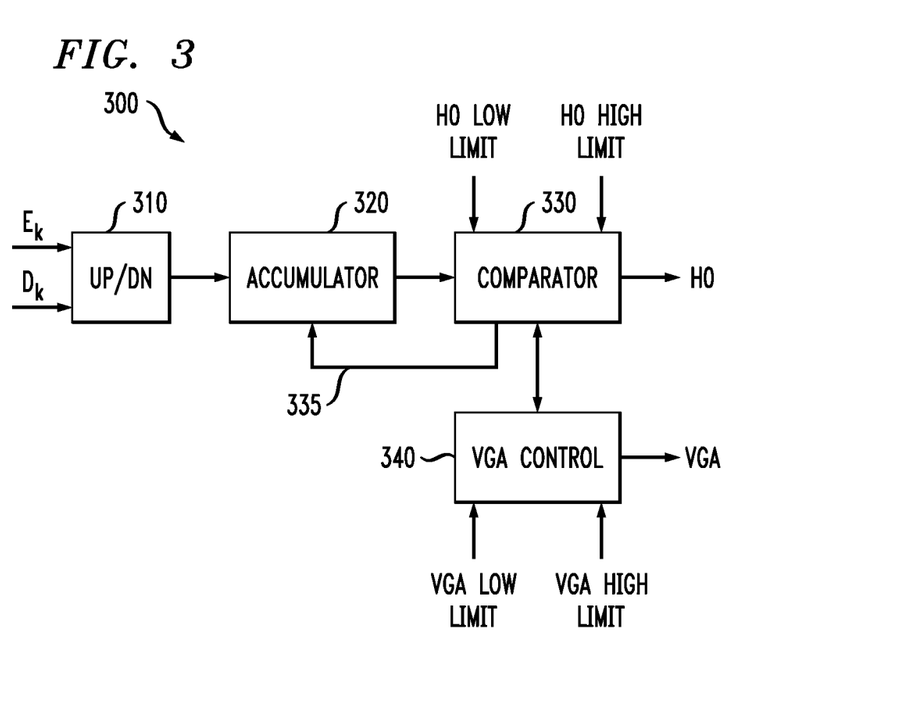
FIG. 3 is a block diagram illustrating a VGA/H0 adaptation block to adapt the error slicers of FIG. 2.

FIG. 3 is a block diagram illustrating a VGA/H0 adaptation block 300, based on equation (2). As shown in FIG. 3, the current data sample $D_k$ from data slicer 220-$D_k$ and the current error sample, $E_k$, from error slicer 240-$E_k$ are applied to an UP/DN decision block 310 described by equation (2), and then an accumulator 320 accumulates the values by adding or subtracting, respectively, from the current level of H0. A comparator 330 receives upper and lower limits for H0 which are typically narrower than the full range of H0 control. The range between H0 limits is related to one step of VGA control, and should be greater than this step. Whenever the comparator 330 determines that H0 control reaches an upper or lower H0 limit, the H0 accumulator is reset to its restart level (between lower and upper limits) using feedback path 335 and VGA Control 340 is incremented or decremented by one. For example, if H0 adaptation causes its accumulator 320 to reach a lower limit, then the signal from the channel 120 is not strong enough, and the signal should get a higher amplification (by increasing the gain adjustment signal applied to VGA 140). In this case, the VGA gain adjustment signal (control) is incremented by one.

The algorithm shown in FIG. 3 runs until H0 settles at a steady level between the corresponding lower and upper limits or the VGA control 340 reaches a predefined low or high limit (all limits are typically programmable). In the latter case, the VGA control 340 stops at the low limit or high limit correspondingly, and H0 is allowed to accumulate beyond its preset limits anywhere within the available range. In this case, VGA amplification may not be enough, and the vertical eye opening may suffer, leading to inferior jitter tolerance. Conversely, if VGA control 340 reaches the lower limit, this may mean that the signal cannot be attenuated enough, and may suffer saturation through the RXFE 142, which is typically not as critical as the lack of amplification, but may cause undesirable non linear effects.

Figure 4:
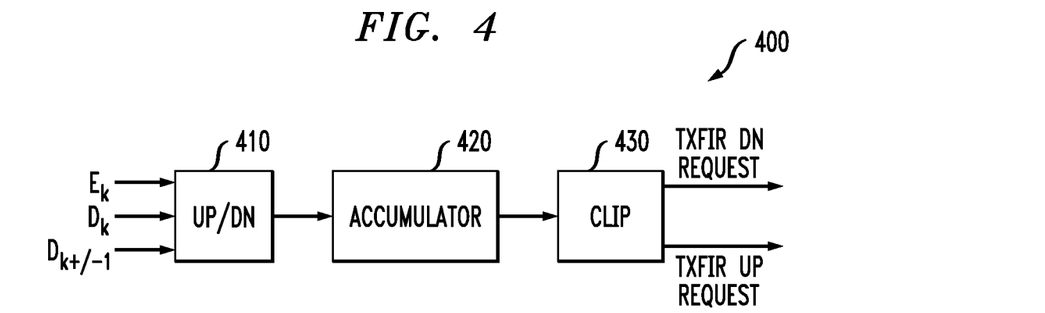
FIG. 4 is a block diagram illustrating a TXFIR filter coefficient adaptation block.

FIG. 4 is a block diagram illustrating a TXFIR filter coefficient adaptation block 400 for the remote TXFIR filter 114 based on equation (1). As shown in FIG. 4, the current data sample $D_k$ from data slicer 220-$D_k$ and the current error sample, $E_k$, from error slicer 240-$E_k$, as well as the prior or subsequent data sample $D_{k+/-1}$ from the corresponding data slicer 220, are applied to an UP/DN decision block 410 described by equation (1), and then an accumulator 420 accumulates the values by adding or subtracting, respectively, from the current accumulator 420 values. If the accumulator 420 reaches an upper or lower limit, the clip block 430 latches the value and the value is conveyed to the link logic 165 as UP or DN requests to be sent through the back channel 130 to the remote SerDes 110-1. In this manner, the TXFIR coefficient values are adjusted to the parameters of the communications channel 120.

Figure 5:
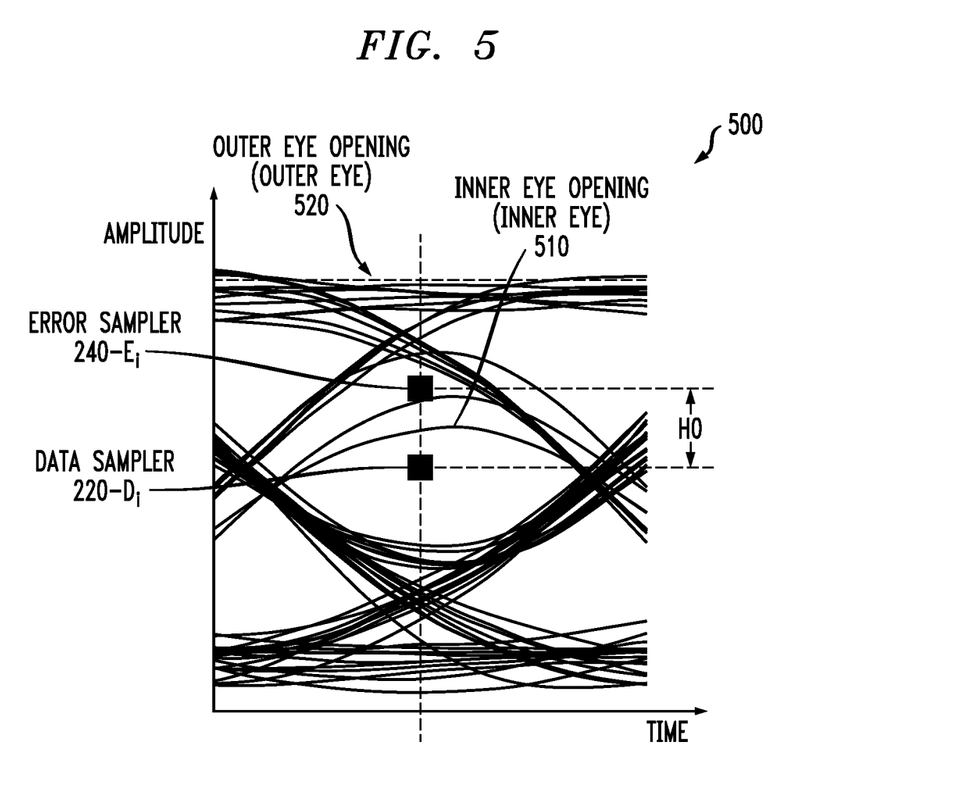
FIG. 5 illustrates a data eye diagram overlaid with exemplary data and error slicers.

FIG. 5 illustrates a data eye diagram 500 overlaid with data slicer 220-$D_i$ and error slicer 240-$E_i$. The data eye has an inner eye opening 510, also referred to as the inner eye 510, which is the minimum opening where no traces are going through. In addition, the data eye has an outer eye opening 520, also referred to as the outer eye 520, which is the maximum of the data eye. In many practical applications, the data slicer 220-$D_i$ is aligned to the statistical center of the data eye with a vertical (voltage) offset of zero, and the error slicer 240-$E_i$ has the same timing alignment as data slicer 220-$D_i$ but with a vertical offset of H0, typically positioning the error slicer 240-$E_i$ in the statistical middle of the data levels at the center of the eye (statistical middle between inner eye 510 and outer eye 520).

Effect of Equalization on Inner Eye 510 and Outer Eye 520

Generally, equalization aims to open the size of the data eye (i.e., increase the data margin). Nonetheless, it has been found that equalization can increase the inner eye 510 by an amount that is smaller than the amount that the outer eye 520 decreases (e.g., outer eye 520 closes more than the inner eye 510 opens). This will cause the statistical middle between the inner eye 510 and the outer eye 520 to reduce, and the offset level H0 for the error latch 240-$E_i$ will readapt to a lower value. The reduction to the H0 level can in turn cause an increase in the VGA gain adjustment, as discussed above in conjunction with FIG. 3.

There are a number of factors causing the inner eye 510 to open to a lesser extent than the outer eye 520 closes. For example, the TXFIR filter 114 typically has a limited bandwidth and acts as a low pass filter. Thus, lower frequency components in the serial data will not suffer the same degradation as pre-emphasis levels.

As indicated above, adaptation of the equalization parameters in a transmit SerDes 110-1 may adversely impact the gain adjustments and/or equalization performed in a receive SerDes 110-2 (or vice versa). For example, in the case of high attenuation channels, it has been found that the coefficients for the TXFIR 114 in the transmit SerDes 110-1 are often increased towards their upper negative limits, causing the VGA 140 in the receive SerDes 110-2 to likewise settle to its upper limits. Thus, the output of the VGA 140 will not follow further increases in emphasis by the TXFIR filter 114. As a result, the data eye opening will be smaller and the jitter tolerance in the receiver is reduced.

Figure 6:
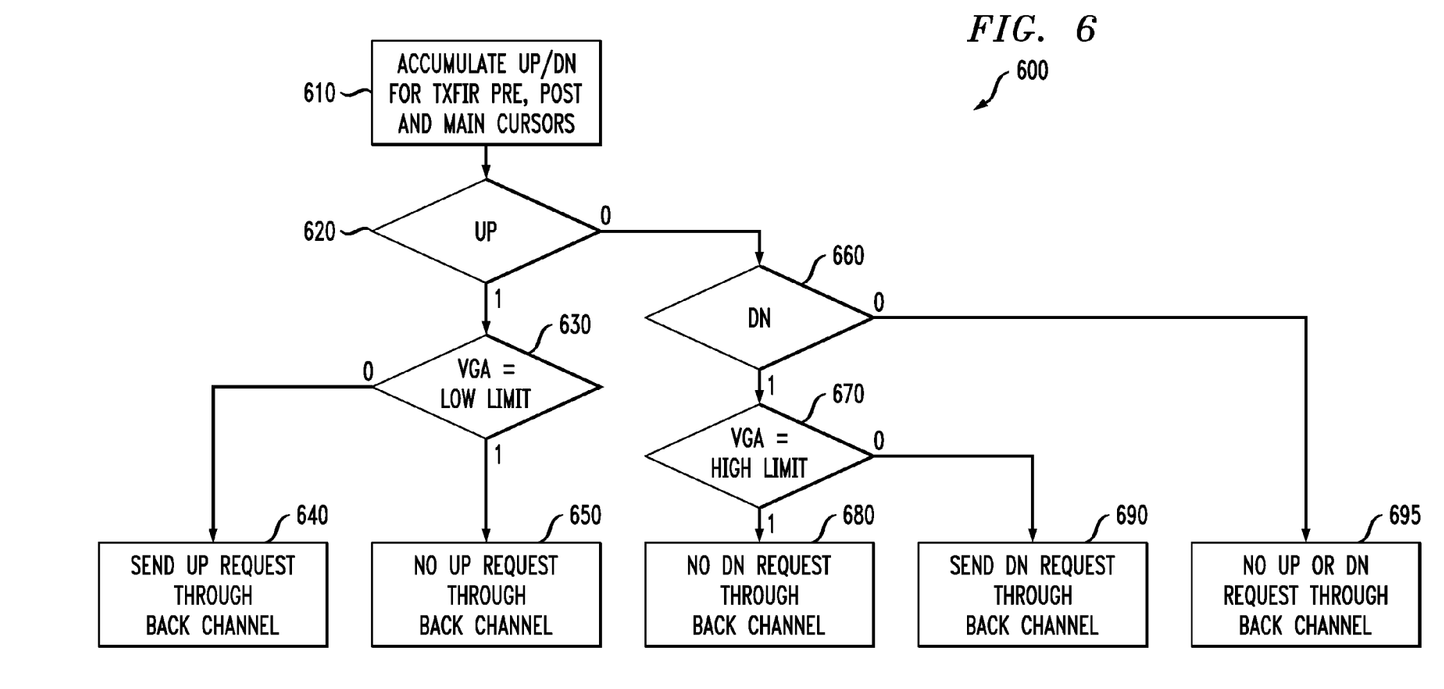
FIG. 6 is a flow chart describing a limited TXFIR adaptation process that incorporates an embodiment of the present invention.

FIG. 6 is a flow chart describing a limited TXFIR adaptation process 600 embodiment of the present invention. The limited TXFIR adaptation process 600 may be implemented, for example, by the RXEQ adaptation block 160. Generally, the limited TXFIR adaptation process 600 prevents the TXFIR 114 from going beyond the abilities of the VGA 140 to amplify the incoming RX signal to the required level.

As shown in FIG. 6, the limited TXFIR adaptation process 600 initially accumulates UP/DN adjustment requests for the pre, post and main cursors of the TXFIR filter 114 during step 610. A test is performed during step 620 to determine if the request is an UP request (reduction in pre-emphasis causing a reduction in inner eye 510 and an increase in outer eye 520). If it is determined during step 620 that the request is an UP request (for example, a binary value of 01), then a further test is performed during step 630 to determine if the VGA 140 is already at its lower limit. If it is determined during step 630 that the VGA 140 is already at its lower limit, then the UP request is suppressed at step 650 and is not sent over the back channel 140. If, however, it is determined during step 630 that the VGA 140 is not at its lower limit, then the UP request is allowed to be sent over the back channel 140 during step 640.

If, however, it was determined during step 620 that the request is not an UP request, then a further test is performed during step 660 to determine if the request is a DN request (for example, a binary value of 11 or 2's complement of −1), then a further test is performed during step 670 to determine if the VGA 140 is already at its high limit. If it is determined during step 670 that the VGA 140 is already at its high limit, then the DN request (increase in pre-emphasis) is suppressed at step 680 and is not sent over the back channel 140. If, however, it is determined during step 670 that the VGA 140 is not at its high limit, then the DN request is allowed to be sent over the back channel 140 during step 690.

Finally, if it was determined during step 620 that the request is not an UP request and it was determined during step 660 that the request is not a DN request, then a request is not sent through the back channel 140 during step 695.

Please note that the same algorithm is run independently for the main cursor, pre-cursors, and post-cursors.

Figure 7:
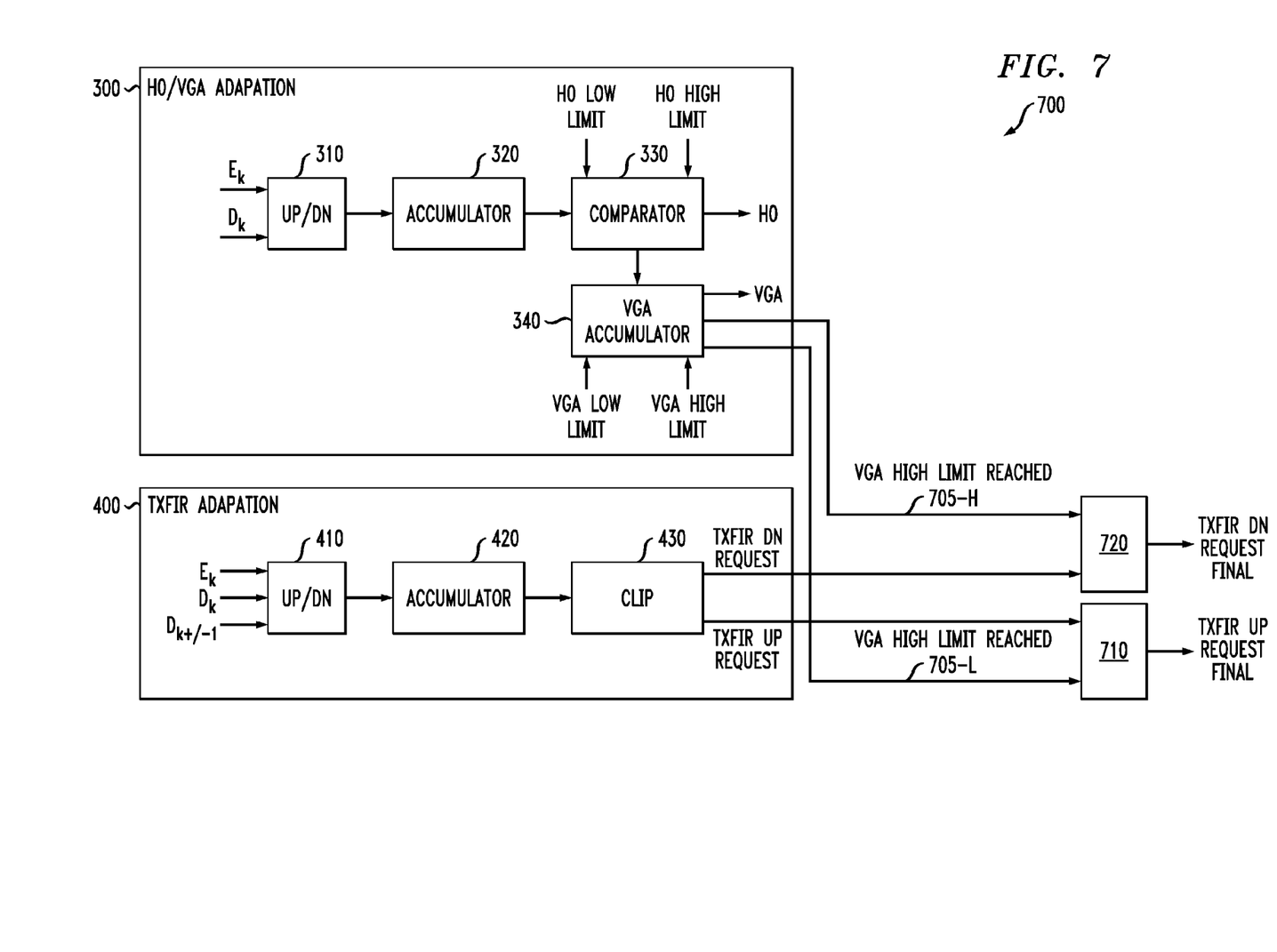
FIG. 7 is a block diagram of a limited TXFIR adaptation system that incorporates an embodiment of the present invention.

FIG. 7 is a block diagram of a limited TXFIR adaptation system 700 embodiment of the present invention. As shown in FIG. 7, the limited TXFIR adaptation system 700 comprises the VGA/H0 adaptation block 300 of FIG. 3 and the TXFIR adaptation block 400 of FIG. 4. The VGA/H0 adaptation block 300 of FIG. 3 has been modified to generate two flags 705-H and 705-L indicating when the VGA high and low limits, respectively, have been reached.

In addition, the limited TXFIR adaptation system 700 includes request gating blocks 710, 720 that gate the UP/DN requests, respectively. As shown in FIG. 7, the request gating block 710 receives the UP requests from the TXFIR adaptation block 400, as well as the VGA flag 705-L indicating whether the VGA 140 has reached its lower limit. The VGA low limit flag 705-L serves as a disable signal for the request gating block 710. Generally, the request gating block 710 will allow the UP requests to pass to the back channel 140 as long as the VGA 140 is above low limit.

Similarly, the request gating block 720 receives the DN requests from the TXFIR adaptation block 400, as well as the VGA flag 705-H indicating whether the VGA 140 has reached its upper limit. The VGA upper limit flag 705-H serves as a disable signal for the request gating block 720. Generally, the request gating block 720 will allow the DN requests to pass to the back channel 140 as long as the VGA 140 is below low limit.

Among other benefits, the disclosed exemplary improved adaptive equalization techniques adjust the TXFIR coefficients based on the VGA gain adaptation and do not establish TXFIR coefficients that are beyond the limits of the VGA.

At least a portion of the techniques of the present invention may be implemented in one or more ICs. In forming ICs, die are typically fabricated in a repeated pattern on a surface of a semiconductor wafer. Each of the die includes a stripline device described herein, and may include other structures or circuits. Individual die are cut or diced from the wafer, then packaged as integrated circuits. One skilled in the art would know how to dice wafers and package die to produce integrated circuits. Integrated circuits so manufactured are considered part of this invention.

An IC in accordance with the present invention can be employed in many application and/or electronic systems. Suitable systems for implementing the invention may include, but are not limited to, communication devices and devices for distributing cable television signals and other high speed signals. Systems incorporating such integrated circuits are considered part of this invention. Given the teachings of the invention provided herein, one of ordinary skill in the art will be able to contemplate other implementations and applications of the techniques of the invention.

Methods may be utilized to form an integrated circuit embodiment of the present invention. The integrated circuit design can be created in a graphical computer programming language, and can be stored in a computer storage medium (such as a disk, tape, physical hard drive, or virtual hard drive such as in a storage access network). The stored design can be converted into the appropriate format (e.g., Graphic Design System II (GDSII)) for the fabrication of photolithographic masks, which typically include multiple copies of the integrated circuit design that are formed on a wafer. The photolithographic masks are utilized to define areas of the wafer (and/or the layers thereon) to be etched or otherwise processed.

The resulting integrated circuits may be distributed by the fabricator in raw wafer form (i.e., as a single wafer that has multiple unpackaged integrated circuits), as a bare die, or in packaged form. In the latter case, the integrated circuit is mounted in a single integrated circuit package (e.g., plastic carrier with leads that are affixed to a motherboard or other higher level carrier) or in a multi-integrated circuit package (e.g., ceramic carrier that has either or both surface interconnections or buried interconnections). In any case, the integrated circuit can be integrated with other chips, discrete circuit elements, and/or other signal processing devices as part of either an intermediate product (e.g., motherboard) or an end product. The end product may be any product that includes integrated circuits.

It is to be understood that the embodiments and variations shown and described herein are merely illustrative of the principles of this invention and that various modifications may be implemented by those skilled in the art without departing from the scope and spirit of the invention.

We claim:

1. A method for adapting coefficients of an equalizer in a transmitter that communicates over a channel with a receiver, comprising:
   determining, at the receiver, if a gain value for an amplifier in said receiver is within a limit of said amplifier;
   receiving a decision for either an UP request or a DOWN request at an accumulator;
   accumulating, with the accumulator, the received decision by either adding the UP request to or subtracting, the DOWN request from a current vertical offset value;
   receiving results of the accumulation at a comparator;
   comparing, with the comparator, the results of the accumulation with upper and lower limits for the vertical offset value;
   in response to determining that the results of the accumulation have reached at least one of the upper and lower limits of the vertical offset value, resetting the accumulator to a restart level using a feedback path;
   selectively communicating results of the determination by the receiver to the transmitter; and
   preventing one or more adjustments to said equalizer coefficients at the transmitter if said gain value does not satisfy said limit of said amplifier.

2. The method of claim 1, wherein said adjustments comprise the UP and DOWN requests for said equalizer coefficients.

3. The method of claim 2, wherein an upward adjustment request is prevented if said gain value does not satisfy a lower limit of said amplifier.

4. The method of claim 2, wherein a downward adjustment request is prevented if said gain value does not satisfy an upper limit of said amplifier.

5. The method of claim 1, further comprising the step of setting one or more flags based on whether said gain value is within said limit of said amplifier.

6. The method of claim 5, further comprising the step of enabling a transmission of said equalizer coefficient adjustments to said transmitter based on said one or more flags.

7. The method of claim 5, further comprising the step of disabling a transmission of said equalizer coefficient adjustments to said transmitter based on said one or more flags.

8. The method of claim 1, wherein said equalizer comprises a transmit finite impulse response (TXFIR) filter and wherein the amplifier comprises a variable gain amplifier.

9. The method of claim 8, further comprising:
determining if a request received at the TXFIR filter is the UP request or the DOWN request;
determining one of:
if the variable gain amplifier is at its upper limit;
if the variable gain amplifier is at its lower limit; and
based on determining if the request received at the TXFIR filter is the UP request or the DOWN request and based on determining if the variable gain amplifier is at either its upper limit or lower limit, communicating either an UP request or a DOWN request to the transmitter via a back channel.

10. An apparatus for adapting one or more coefficients of an equalizer in a transmitter that communicates over a channel with a receiver, comprising:
a memory; and
at least one hardware device, coupled to the memory, operative to:
determining if a gain value for an amplifier in said receiver is within a limit of said amplifier;
receiving a decision for either an UP request or a DOWN request at an accumulator;
accumulating, with the accumulator, the received decision by either adding the UP request to or subtracting the DOWN request from a current vertical offset value;
receiving results of the accumulation at a comparator;
comparing, with the comparator, the results of the accumulation with upper and lower limits for the vertical offset value;
in response to determining that the results of the accumulation have reached at least one of the upper and lower limits of the vertical offset value, resetting the accumulator to a restart, level using a feedback path; and
preventing one or more adjustments to said equalizer coefficients if said gain value does not satisfy said limit of said amplifier by selectively enabling or suppressing communication of results of the determining step via a back channel established between the transmitter and receiver.

11. The apparatus of claim 10, wherein said adjustments comprise the UP and DOWN requests for said coefficients.

12. The apparatus of claim 11, wherein an upward adjustment request is prevented if said gain value does not satisfy a lower limit of said amplifier.

13. The apparatus of claim 11, wherein a downward adjustment request is prevented if said gain value does not satisfy an upper limit of said amplifier.

14. The apparatus of claim 10, wherein said at least one hardware device is further configured to set one or more flags based on whether said gain value is within said limit of said amplifier.

15. The apparatus of claim 14, wherein said at least one hardware device is further configured to enable a transmission of said coefficient adjustments to said transmitter based on said one or more flags.

16. The apparatus of claim 14, wherein said at least one hardware device is further configured to disable a transmission of said coefficient adjustments to said transmitter based on said one or more flags.

17. An article of manufacture for adapting coefficients of an equalizer in a transmitter that communicates over a channel with a receiver, comprising a non-transitory machine readable recordable medium containing one or more programs which when executed implement the steps of:
determining if a gain value for an amplifier in said receiver is within a limit of said amplifier;
receiving a decision for either an UP request or a DOWN request at an accumulator;
accumulating, with the accumulator, the received decision by either adding the UP request to or subtracting the DOWN request from a current vertical offset value;
receiving results of the accumulation at a comparator;
comparing, with the comparator, the results of the accumulation with upper and lower limits for the vertical offset value;
in response to determining that the results of the accumulation have reached at least one of the upper and lower limits of the vertical offset value, resetting the accumulator to a restart level using a feedback path;
selectively communicating information regarding the gain value for the amplifier of the receiver to the transmitter; and
based on the communicated information regarding the gain value for the amplifier of the receiver, preventing one or more adjustments to said coefficients if said gain value does not satisfy said limit of said variable gain amplifier.

18. The article of manufacture of claim 17, wherein said adjustments comprise the UP and DOWN requests for said coefficients.

19. The article of manufacture of claim 18, wherein an upward adjustment request is prevented if said gain value does not satisfy a lower limit of said amplifier.

20. The article of manufacture of claim 18, wherein a downward adjustment request is prevented if said gain value does not satisfy an upper limit of said amplifier.

21. The article of manufacture of claim 17, further comprising the step of setting one or more flags based on whether said gain value is within said limit of said amplifier.

22. An integrated circuit for adapting coefficients of an equalizer in a transmitter that communicates over a channel with a receiver, comprising:
gain limit circuitry operative to:
determine if a gain value for an amplifier in said receiver is within a limit of said amplifier;
receive a decision for either an UP request or a DOWN request;
accumulate the received decision by either adding the UP request to or subtracting the DOWN request from a current vertical offset value;
receive results of the accumulation;
compare the results of the accumulation with upper and lower limits for the vertical offset value;
in response to determining that the results of the accumulation have reached at least one of the upper and lower limits of the vertical offset, value, reset an accumulator to a restart level; and
request gating circuitry operative to:
selectively communicate an adjustment request to the transmitter via a back channel to prevent one or more adjustments to said coefficients if said gain value does not satisfy said limit of said amplifier.

23. The integrated circuit of claim 22, wherein said adjustments comprise the UP and DOWN requests for said coefficients.

24. The integrated circuit of claim 23, wherein an upward adjustment request is prevented if said gain value does not satisfy a lower limit of said amplifier.

25. The integrated circuit of claim 23, wherein a downward adjustment request prevented if said gain value does not satisfy an upper limit of said amplifier.

26. The integrated circuit of claim 22, wherein said gain limit circuitry sets one or more flags based on whether said gain value is within said limit of said amplifier.

27. The integrated circuit of claim 26, wherein said request gating circuitry enables a transmission of said coefficient adjustments to said transmitter based on said one or more flags.

28. The integrated circuit of claim 26, wherein said request gating circuitry disables a transmission of said coefficient adjustments to said transmitter based on said one or more flags.

\* \* \* \* \*